United States Patent Office 3,340,246
Patented Sept. 5, 1967

3,340,246
PROCESS FOR THE SYNTHESIS OF AMIDES, ESTERS, ALKYL HALIDES, CARBOXYLIC ACID ANHYDRIDES, AND PEPTIDES EMPLOYING AMINOACETYLENES AS WATER ACCEPTORS
Heinz G. Viehe, Linkebeek, Belgium, assignor to Union Carbide Corporation, a corporation of New York
No Drawing. Filed June 18, 1964, Ser. No. 376,253
14 Claims. (Cl. 260—112.5)

This invention relates to condensation reactions, that is, chemical reactions in which water is eliminated between two functional groups with the formation of a new chemical bond. More particularly, the invention is directed to the use of aminoacetylenes as water accepting agents in such condensation reactions.

In organic chemistry, condensation reactions are generally defined as those reactions in which the elements of water, namely, two hydrogen atoms and an oxygen atom are eliminated between two functional groups with the formation of a new chemical bond. A typical condensation reaction is the reaction of acetic acid and ethyl alcohol to produce ethyl acetate and water.

It has now been discovered that the use of aminoacetylenes as water accepting agents improves the efficiency of such condensation reactions. Further, the use of aminoacetylenes permits the use of milder reaction conditions and greatly increases the yield of the condensation product. Further, aminoacetylenes are superior as water accepting agents to any other water accepting agents heretofore known.

It is therefore an object of this invention to provide an improved method for carrying out chemical condensation reactions.

A further object of the invention is to provide a process wherein aminoacetylenes are employed as water accepting agents in condensation reactions.

A further object of the invention is to provide a method for producing peptides, acid anhydrides, carboxylic acid esters and organic halides in high yield under mild conditions.

These and other objects and advantages of the invention will be apparent from the following description and appended claims.

According to the process of this invention a reaction mixture is formed which contains: (1) an organic compound containing at least one organic functional group in which a hydroxy radical is bonded to a carbon atom, (2) another compound, either organic or inorganic, which contains an active hydrogen atom, and (3) an aminoacetylene compound represented by the formula (A) 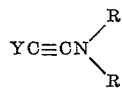

wherein R is a monovalent hydrocarbon group, Y is an R group, a hydrogen atom or an NR$_2$ group, and two R groups on the same nitrogen atom can together form a divalent alkylene group.

In the compounds of Formula A the various R groups can be the same or different throughout the same molecule, and the R groups preferably contain from 1 to about 18 carbon atoms.

The R groups in Formula A can be alkyl, aryl, alkaryl, aralkyl, alkenyl, alkynyl, cycloalkyl, cycloalkenyl, and the like groups. For example, R can be methyl, ethyl, n-butyl, tertiary-butyl, 2,2-dimethyl-n-propyl, isooctyl, octadecyl, phenyl, phenylethyl, terphenyl, cumyl, mesityl, cyclopentyl, ethylcyclohexenyl, allyl, or butyne-2-yl groups, and the like, and two R groups on the same nitrogen atom can together be tetramethylene, 3-ethylhexamethylene, decamethylene, and the like.

Typical organic functional groups in which a hydroxy radical is bonded to a carbon atom include the carboxyl group —COOH and the primary, secondary and tertiary alcohol groups —CH$_2$OH,

and

Typical compounds which contain active hydrogen atoms include hydrogen halides and compounds in which a hydrogen atom is bonded to oxygen, nitrogen, sulphur, phosphorus, and the like. A group of active hydrogen-containing compounds which are particularly suitable for use in the present invention are hydrogen halides and organic compounds containing functional groups in which the active hydrogen atom is bonded to oxygen or nitrogen.

An individual compound useful in the process of this invention can contain within the same molecule more than one functional group which enters into the condensation reaction, for example a dicarboxylic acid or a diol. The compounds should also be free from functional groups which do not enter into the condensation reaction, but which would undergo significant side reactions under the conditions of the desired condensation reaction. Further, the same functional group can be the source of both the carbon bonded hydroxy radical and the active hydrogen atom. For example, two molecules of acetic acid will react in a condensation reaction with the formation of acetic anhydride and water.

Throughout the present specification and claims, C$_6$H$_5$, C$_6$H$_4$, C$_4$H$_9$, i-C$_4$H$_9$, and t-C$_4$H$_9$ represent respectively the phenyl, phenylene, normal butyl, isobutyl and tertiary butyl groups.

Typical compounds represented by Formula A are the following:

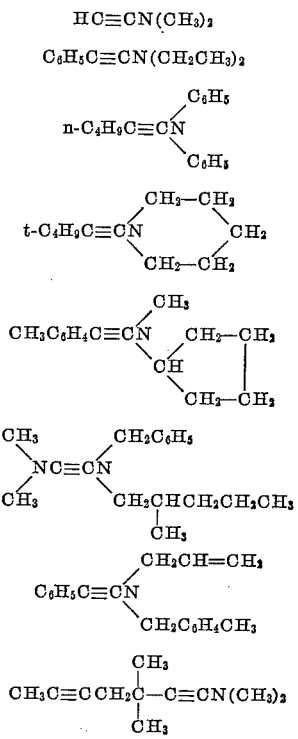

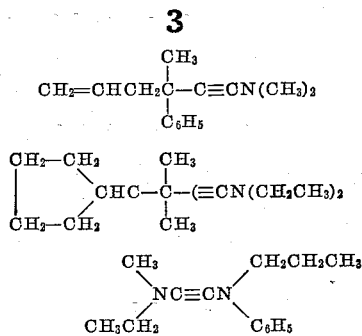

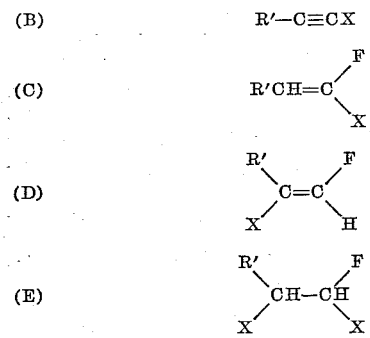

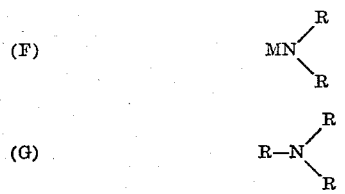

The compounds of Formula A can be prepared by the reaction of compounds represented by the following formulas (B)  $\quad R'-C\equiv CX$ (C)  $\quad R'CH=C\begin{matrix}F\\X\end{matrix}$ (D)  $\quad \begin{matrix}R'\\X\end{matrix}C=C\begin{matrix}F\\H\end{matrix}$ (E)  $\quad \begin{matrix}R'\\X\end{matrix}CH-CH\begin{matrix}F\\X\end{matrix}$ with compounds represented by one of the formulas (F)  $\quad MN\begin{matrix}R\\R\end{matrix}$ (G)  $\quad R-N\begin{matrix}R\\R\end{matrix}$ In Formulas B, C, D, E, F and G, R has the meaning defined hereinabove with reference to Formula A, R' represents hydrogen or an R group, X represents a halogen, preferably fluorine, chlorine, or bromine, and M represents an alkali metal, namely, lithium, potassium, rubidium, cesium or francium.

The process for producing the compounds of Formula A comprises mixing together in a hydrocarbon, hydrocarbon ether or tertiary amine solvent a compound of Formula B, C, D or E and a compound of Formula F or G, and maintaining the mixture at a temperature between about −25° C. and 150° C. until the compound of Formula A is produced. Preferably, the reactants are employed in the ratio of at least one mole of the compound of Formula F or G per gram atom of halogen in the compound of Formula B, C, D, or E. A slight excess of the compound of Formula F or G over and above this ratio is often desirable. Preferably the reaction mixture is stirred during the course of the reaction.

It is preferable to carry out the reaction producing compounds of Formula A under anhydrous conditions and in the absence of oxygen. This can be conveniently done by carrying out the reaction under an atmosphere of inert gas, such as nitrogen, argon, helium, and the like.

Organic solvents useful in this process include hydrocarbons, hydrocarbon ethers, and tertiary amines represented by Formula G hereinabove. Illustrative solvents include hydrocarbons such as petroleum ether, cyclohexane, 2-ethylhexane, benzene, toluene, xylene and the like, and ethers such as diethyl ether, diisopropyl ether, methylbutyl ether, dioxane, tetrahydrofuran, ethylene glycol dimethyl ether, diethylene glycol dimethyl ether, and the like, and tertiary amines of Formula G hereinabove.

Where highly volatile reactants, such as HC≡CF, t-C$_4$H$_9$CHBrCHBrF or CHF=CCl$_2$ are employed, it is preferable to form the reaction mixture at −80° C. or below and then warm the mixture to −20° C. to 25° C. where reaction will take place.

Where R' in Formula B is hydrogen, the reaction of a compound of Formula B with a compound of Formula F first produces a compound having the formula $$MC\equiv CNR_2$$

which on treatment with an aliphatic alcohol gives the desired compound HC≡CNR$_2$.

Where a compound of Formula G is used, it is convenient to use an excess of this compound as a solvent.

The process can also be carried out using a mixture of compounds of Formulas F and G, both of which will then react with the compound of Formula B, C, D or E to yield compounds of formula A. For example, the reaction of C$_6$H$_5$C≡CCl with a mixture of LiN(CH$_3$)$_2$ and N(CH$_3$)$_3$ gives primarily C$_6$H$_5$C≡CN(CH$_3$)$_2$, while the reaction of C$_6$H$_5$C≡CCl with a mixture of LiN(CH$_2$CH$_3$)$_2$ and N(CH$_3$)$_3$ gives a mixture of C$_6$H$_5$C≡CN(CH$_3$)$_2$ and C$_6$H$_5$C≡CN(CH$_2$CH$_3$)$_2$. The relative amounts of products in such product mixtures depend on the relative reactivities of the compounds of Formulas F and G. In such reactant mixtures, the compound of Formula G is both a reactant and a solvent.

Where a compound of Formula G is used, and the R groups are not all the same, the primary product will depend on which nitrogen-R group bond is most easily broken. It has been found, for example, that a typical order of decreasing ease of R—N bond breaking is allyl-N, benzyl-N, methyl-N, ethyl-N, and n-propyl-N. Thus, the reaction of C$_6$H$_5$C≡CCl with

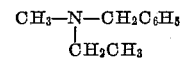

yields primarily

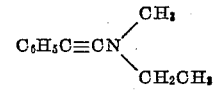

When the solvent is a hydrocarbon or hydrocarbon ether, the preferred reaction temperatures are −25° C. to 20° C., and when the solvent is a tertiary amine, higher temperatures up to 150° C. are preferred.

There is no particular advantage to be gained in carrying out the reaction at pressures other than atmospheric pressure. However, when a sealed reaction vessel is employed, the autogeneous pressure of the reaction mixture at the reaction temperature is satisfactory.

Formation of the compound of Formula A in good yield generally takes from a few hours up to several days depending on the particular temperature, solvent and reactants.

The reaction product, a compound of Formula A, is separated from the reaction mixture by conventional methods which include separation of liquid from precipitated salts and other solids, and isolation of the desired product by evaporation of solvent, fractional distillation, and the like. Product separation is preferably carried out under an inert atmosphere.

Examples of producing compounds of Formula A (underlined) are the following:

(a)
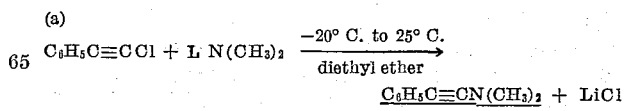

(b)
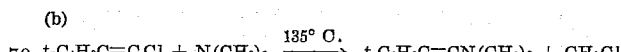

(c)
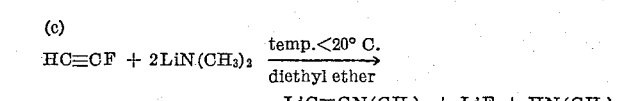

LiC≡CN(CH₃)₂ + (CH₃)₂CHOH $\xrightarrow{\text{diethyl ether}}$

HC≡CN(CH₃)₂ + (CH₃)₂CHOLi (d) 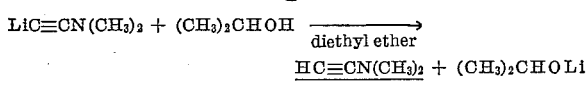

C₆H₅CH=C(F)(Cl) + 2LiN(CH₂CH₃)₂ $\xrightarrow[\text{diethyl ether}]{-80^\circ \text{C. to } 20^\circ \text{C.}}$ C₆H₅C≡CN(CH₂CH₃)₂ + LiCl + LiF + HN(CH₂CH₃)₂

(e)

C₆H₅CH=CCl₂ + 2LiN(CH₃)₂ $\xrightarrow[\text{diethyl ether}]{-80^\circ \text{C. to } 20^\circ \text{C.}}$ C₆H₅C≡CN(CH₃)₂ + 2LiCl + HN(CH₃)₂

(f) 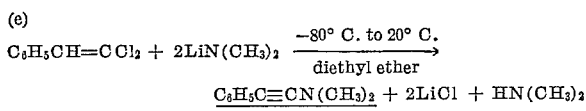

t-C₄H₉—C(H)(Br)—C(H)(Br)—F + 3LiN(CH₃)₂ $\xrightarrow[\text{diethyl ether}]{-80^\circ \text{C. to } 20^\circ \text{C.}}$ t-C₄H₉C≡CN(CH₃)₂ + LiF + 2LiBr + 2HN(CH₃)₂

(g) 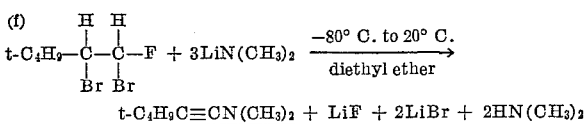

$\underset{H}{\overset{F}{\diagdown}}C=C\underset{Cl}{\overset{Cl}{\diagup}}$ + 3LiN(i-C₄H₉)₂ $\xrightarrow[\text{diethyl ether}]{-80^\circ \text{C. to } 20^\circ \text{C.}}$ (i-C₄H₉)₂NC≡CN(i-C₄H₉)₂ + LiF + 2LiC The process of the present invention can be carried out with or without a solvent. However, an inert organic solvent is preferred. Suitable inert solvents include hydrocarbons, halogenated hydrocarbons, and hydrocarbon ethers, for example, hydrocarbons such as petroleum ether, cyclohexane, 2-ethylhexane, benzene, toluene, xylene and the like, and ethers such as diethyl ether, diisopropyl ether, methylbutyl ether, dioxane, tetrahydrofuran, ethylene glycol dimethyl ether, diethylene glycol dimethyl ether, and the like, and halogenated hydrocarbons such as methylene chloride, trichloroethane, chlorobenzene, bromobenzene, and the like.

The temperatures at which the process of this invention is carried out can vary widely depending upon the particular reactants, and the proper choice of temperature is illustrated by the discussions hereinbelow relating to specific embodiments of the invention.

In the process of this invention, the reactants and the aminoacetylene can be mixed together in any order. However, it has been found preferable to add the aminoacetylene compound to a mixture of the compound containing the carbon bonded hydroxy radical and the compound containing the active hydrogen. It is also preferable to employ the aminoacetylene compound of Formula A in an amount of at least one mole of aminoacetylene compound per mole of whichever of the reactants (the compound containing the carbon bonded hydroxy radical or the compound containing the active hydrogen atom) is present in the smaller amount in the reaction mixture. Stated otherwise, the amount of aminoacetylene compound employed is preferably at least one mole of aminoacetylene for every mole of water released in the condensation reaction.

In one important embodiment of the present invention, two carboxylic acid groups are reacted in a condensation reaction to produce a carboxylic acid anhydride. This embodiment of the invention can be represented by the following equation (H)

2GCOOH + YC≡CNR₂ ⟶ (GCO)₂O + YCH₂CNR₂
$\qquad\qquad\qquad\qquad\qquad\qquad\qquad\qquad\overset{\|}{\text{O}}$ In this equation, G represents an organic group which does not undergo significant side reactions under the condensation reaction process conditions of this invention. Stated otherwise, G is an organic group free of sites which are reactive in chemical reactions other than water-eliminating condensation reactions. Illustrative compounds represented by the formula GCOOH are the following:

acetic acid, butyric acid, benzoic acid, p-chlorobenzoic acid, phenylacetic acid, CH₃OCH₂COOH, stearic acid, oleic acid, methacrylic acid, and the nitrogen-containing or nitrogen and sulfur-containing acids designated compounds A, D F and I hereinbelow.

It is understood that more than one carboxyl group can be present in the same molecule. For example, succinic acid undergoes a condensation reaction according to Equation H hereinabove with the formation of succinic anhydride. In this instance, the two G groups can be considered as joined together to provide a compound containing two carboxylic acid groups in the same molecule.

Also, the two carboxylic acid compounds of the Equation H need not be identical. For example, a mixture of acetic acid and propionic acid react according to Equation H to give a mixture of the anhydrides (CH₃CO)₂O, (CH₃CH₂CO)₂O and CH₃CH₂CO—O—COCH₃.

In the formation of acid anhydrides according to Equation H, it is preferable to employ one of the hydrocarbon, halogenated hydrocarbon or hydrocarbon ether solvents described hereinabove. Preferred temperatures for the formaiton of the acid anhydrides according to Equation H are in the range of about 0° C. to about 50° C. There is no advantage to the use of other than atmospheric pressure for this reaction.

After the carboxylic acids GCOOH and the aminoacetylene of Formula A have been mixed together, the acid anhydride forms in high yield after about one minute to thirty minutes, depending on the particular reactants, solvents and temperature.

Preferably, the reaction is carried out under anhydrous conditions and in an inert atmosphere provided by a nonreactive gas such as nitrogen, argon, helium, and the like. Preferably, the reactants should be employed in a ratio of at least one mole of aminoacetylene compound to two moles of carboxylic acid group, that is, one mole of aminoacetylene per mole of water eliminated in the condensation reaction.

The use of the aminoacetylene compounds of Formula A in the reaction of carboxylic acids to produce acid anhydrides permits the production of the acid anhydrides in a higher yield and in a much shorter time than was possible with the best anhydrization catalysts heretofore known. This advantage of the present invention is further illustrated in the illustrative examples hereinbelow.

In another important embodiment of the present invention, a peptization reaction (amide formation reaction) is carried out according to the following equation:

(I)

GCOOH + GNH₂ + YC≡CNR₂ ⟶ GCONHG + YCH₂CNR₂
$\qquad\qquad\qquad\qquad\qquad\qquad\qquad\qquad\qquad\qquad\overset{\|}{\text{O}}$ wherein G has the meaning defined with reference to Equation H hereinabove. Typical compounds represented by the formula GCOOH have been described with reference to Equation H hereinabove. Typical compounds represented by the formula GNH₂ are the following: methyl amine, butyl amine, allyl amine, aniline, p-chloroaniline, cyclohexyl amine, n-dodecyl amine, benzyl amine,

CH₃CH₂OCH₂CH₂NH₂

H₂NCH₂CH₂CH₂Si(OCH₂CH₃)₃
$\qquad\qquad\quad\overset{\text{CH}_3}{|}$ and the amines containing ester groups designated compounds B and G hereinbelow.

More than one amino group can be present in the same molecule. For example, the reaction of ethylene diamine and acetic acid in the presence of an aminoacetylene compound of Formula A produces the compound CH₃CONHCH₂CH₂NHCOCH₃.

The formulas GCOOH and GNH₂ include within their scope amino-acid molecules in which either the amino group or the carboxylic acid group has been blocked to render these groups non-reactive in the condensation reaction. Also, the COOH group and NH₂ group can be present in the same molecule. For example, $$H_2NCH_2CH_2CH_2COOH$$

reacts in the presence of an aminoacetylene of Formula A to produce the lactam

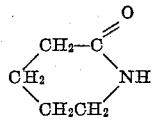

It is a particularly important advantage of the process of this invention that amino acid molecules can be condensed to form peptide linkages, which process can be repeated a number of times to produce polypeptides. A preferred form of the process of Equation I is carried out by mixing together an amino acid in which the amino group is blocked and an amino acid in which the carboxyl group is blocked, and then adding to this mixture an aminoacetylene of Formula A. The condensation reaction takes place rapidly and efficiently and the condensation product (peptide) is obtained in yields of 97 percent and greater.

The process represented by Equation I is preferably carried out in one of the hydrocarbon, halogenated hydrocarbon or hydrocarbon ether solvents described hereinabove and at a temperature in the range of about 0° C. to about 50° C. There is no advantage to employing pressures other than atmospheric pressure.

When a carboxylic acid, an amine and an aminoacetylene are mixed together according to Equation I, the desired peptide product is generally produced in about 15 minutes to several hours. The reaction is preferably carried out under anhydrous conditions and in an inert atmosphere provided by a non-reactive gas such as nitrogen, helium, argon, and the like. In the reaction of Equation I, the carboxylic acid and the amine are preferably employed in a 1:1 stoichiometric ratio and the aminoacetylene compound is employed in a ratio of at least one mole of aminoacetylene per mole of water produced by the condensation reaction.

In another important embodiment of the present invention, an organic alcohol and a hydrogen halide are reacted in the presence of an aminoacetylene of Formula A to produce an organic halide. This reaction can be represented by the equation (J)  $GOH + HX + YC\equiv CNR_2 \longrightarrow GX + YCH_2\underset{\underset{O}{\|}}{C}NR_2$ wherein G has the meaning defined hereinabove with reference to Equations H and I, and X is a halogen, namely, fluorine, chlorine, bromine, iodine or astatine. Preferably G is a hydrocarbon group in the reaction of Equation J. Typical compounds represented by the formula GOH are the following: methanol, butanol, dodecanol, benzyl alcohol, phenol, p-bromophenyl ethanol, CH₃OCH₂CH₂OH, ClCH₂CH₂CH₂CH₂OH, allyl alcohol, cyclohexanol, and the like.

The organic alcohol can contain more than one hydroxyl group. For example, the compound $$HOCH_2CH_2CHOHCH_2CH_2OH$$

reacts with HCl in the presence of an aminoacetylene of Formula A to produce ClCH₂CH₂CHClCH₂CH₂Cl. In this instance, three GOH units can be considered as bonded together through the G groups to provide a single molecule containing multiple carbon bonded hydroxyl groups.

The reaction of Equation J is preferably carried out in one of the above-described hydrocarbon, halogenated hydrocarbon or hydrocarbon ether solvents with the proviso that the solvent be liquid at the reaction temperature.

The reaction of the Equation J is preferably carried out at temperatures below 0° C. and most preferably at temperatures below −25° C. in order to minimize reaction between the hydrogen halide and the aminoacetylene.

Where a gaseous hydrogen halide is employed, it is often advantageous to carry out the reaction at pressures above atmospheric pressure in order to increase the solubility of the hydrogen halide in the reaction mixture. The time necessary to produce the desired organic halide of formula GX by the process of Equation J generally varies from about five minutes to several hours. It is desirable to carry out the reaction under anhydrous conditions and under an atmosphere of the hydrogen halide gas employed as a reactant.

In the process of Equation J, the alcohol GOH and the aminoacetylene compound are preferably employed in a molar ratio of 1:1 and a stoichiometric excess of hydrogen halide gas is desirable.

The process of Equation J produces organic fluorides, for example, C₆H₅CH₂CH₂F and F(CH₂)₆F efficiently and in high yield. These same organic fluorides are in general difficult to prepare by methods heretofore known.

Another important embodiment of the present invention is the production of organic esters by means of the process of the present invention. This process can be represented by the following equation (K)
$GCOOH + GOH + YC\equiv CNR_2 \longrightarrow GCOOG + YCH_2\underset{\underset{O}{\|}}{C}NR_2$ wherein G has the meaning defined hereinabove. Typical compounds represented by GCOOH have been described hereinabove with reference to Equations H and I, and some representative alcohols GOH have been described hereinabove with reference to Equation J. Additional examples of alcohols which can be employed to form esters in accordance with the process of Equation K are the following: p-nitrophenol, the oxime $$HON=CHCH_2CH_3,$$

the amidoxime $$HON=\underset{\underset{NH_2}{|}}{C}CH_2CH_3$$

and sugars such as glucose and fructose.

More than one carboxyl group can be present on a single molecule or more than one hydroxy group can be present on a single molecule. For example, malonic acid reacts with ethanol in the presence of an aminoacetylene to produce CH₃CH₂OCOCH₂COOCH₂CH₃ and 1,3-propyleneglycol reacts with acetic acid in the presence of an aminoacetylene to produce CH₃COOCH₂CH₂CH₂OCOCH₃. Also the COOH group and OH group can be present in the same molecule. For example, HOCH₂CH₂CH₂COOH reacts in the presence of an aminoacetylene of Formula A to produce the lactone

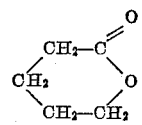

The reaction conditions for ester formation according to the process of Equation K are generaly similar to those described hereinabove with reference to the anhydride formation reaction of Equation H.

Examples of ester formation according to the process of Equation K are the following:

(h)
$CH_3COOH + HOCH_2CH_2OCH_3 + C_6H_5C\equiv CN(CH_3)_2 \longrightarrow$
$\qquad CH_3COOCH_2CH_2OCH_3 + C_6H_5CH_2\underset{\underset{O}{\|}}{C}N(CH_3)_2$ (i)
$C_6H_5COOH + HOC_6H_4NO_2 + t\text{-}C_4H_9C\equiv CN(C_6H_5)_2 \longrightarrow$
$\qquad C_6H_5COOC_6H_4NO_2 + t\text{-}C_4H_9CH_2\underset{\underset{O}{\|}}{C}N(C_6H_5)_2$ (j)

$$CH_3CH_2CH_2COOH + HON=CHCH_2CH_3 + CH_3C_6H_4C\equiv CN(i-C_4H_9)_2 \longrightarrow$$

$$CH_3CH_2CH_2\overset{O}{\underset{\|}{C}}-N=CHCH_2CH_3 + CH_3C_6H_4CH_2\overset{}{\underset{\|}{C}N}(i-C_4H_9)_2$$
$$\phantom{xxxxxxxxxxxxxxxxxxxxxxxxxxxxxxxxxxxxxxxxxxxxx}\overset{\|}{O}$$

Other reactions which further illustrate the process of the present invention are the following:

(k)

$$CH_3COOH + HSCH_2CH_2CH_3 + C_6H_5C\equiv CN(CH_3)_2 \longrightarrow$$

$$CH_3\overset{O}{\underset{\|}{C}}-SCH_2CH_2CH_3 + C_6H_5CH_2\overset{O}{\underset{\|}{C}N}(CH_3)_2$$

(l)

$$CH_3CH_2CH_2OH + HP(C_6H_5)_2 + (CH_3)_2NC\equiv CN(CH_3)_2 \longrightarrow$$
$$CH_3CH_2CH_2P(C_6H_5)_2 + (CH_3)_2NCH_2\underset{\|}{C}N(CH_3)_2$$
$$\phantom{xxxxxxxxxxxxxxxxxxxxxxxxxxxxxxxxxxxx}O$$

With further reference to the production of compounds of Formula A, compounds of the formula $R_2NC\equiv CNR_2$ can be produced by the reaction of a compound of the formula $HXC=CFX$ with a compound of Formula F. The reaction mixture is preferably formed at $-80°$ C. or below and the reaction takes place on warming to room temperature. This process is illustrated by Equation $g$ hereinabove. Where a mixture of compounds of Formula F is employed, compounds of the formula $R_2NC\equiv CNR_2$ are produced wherein the two $R_2N$ groups are different.

The following more detailed illustrative examples are presented.

*Example 1*

A benzene solution containing 2.25 g. (0.018 moles) of $t\text{-}C_4H_9C\equiv CN(CH_3)_2$ was added to 150 ml. of benzene containing 3.65 g. (0.03 mole) of dissolved benzoic acid, both initial solutions and the final solution being maintained at 10° C. Five minutes after mixing the two solutions, the final solution was extracted with 5 percent aqueous sodium hydroxide to remove unreacted benzoic acid. The extracted benzene solution was dried, the benzene evaporated and the residue fractionally distilled at 15 mm. Hg. The distillate included 1.7 g. of $$t\text{-}C_4H_9CH_2\overset{O}{\underset{\|}{C}}-N(CH_3)_2$$

The residue remaining after distillation comprised 3.3 g. (97 percent yield) of benzoic anhydride, M.P. 35°–40° C.

*Example 2*

This example demonstrates the superiority of the aminoacetylenes useful in this invention over the best anhydrization agents heretofore known.

Eight separate runs were carried out. In each run, a 0.1 molar benzene solution of a carboxylic acid and a 0.1 molar benzene solution of anhydrization agent (water acceptor) were mixed and maintained at 10° C. for 5 minutes. The reaction was then quenched by extracting unreacted carboxylic acid with aqueous sodium hydroxide. The yield of acid anhydride was calculated from the amount of unreacted carboxylic acid (determined by titration of the sodium hydroxide extract). The results are summarized in the following table.

*Example 3*

At $-80°$ an excess of HCl gas was bubbled through a solution of 0.725 g. (0.005 mole) 1-phenyl-2-dimethylaminoacetylene and 0.792 g. (0.005 mole) n-decylalcohol in 20 ml. of methylene chloride. After 15 minutes, the solution was washed with water, dried over $Na_2SO_4$ and distilled. The n-decylchloride distilled at 90° C./10 mm. Hg, and was purified by passing through an alumina column in order to eliminate such polar components as unreacted alcohol and the amide $$C_6H_5CH_2\overset{O}{\underset{\|}{C}}N(CH_3)$$

Petroleum ether (B.P. 40–50°) was used for the elution. After evaporation of the petroleum ether, 0.75 g. of n-decylchloride were obtained. Yield: 85%; $n_D^{23°}=1.4341$, in agreement with the literature.

*Example 4*

Following the procedure of Example 3, hydrogen bromide gas was bubbled through a mixture of 1-phenyl-2-dimethylaminoacetylene and n-decyl alcohol for 1.5 hours. n-Decylbromide, B.P. 130° C. at 10 mm. Hg, was recovered from the reaction mixture in 81 percent yield.

*Example 5*

$$C_6H_5CH_2CH_2OH + HF + C_6H_5C\equiv CN(CH_3)_2 \longrightarrow$$
$$C_6H_5CH_2CH_2F + C_6H_5CH_2\underset{\|}{C}N(CH_3)_2$$
$$\phantom{xxxxxxxxxxxxxxxxxxxxxxxxxxxxxx}O$$

1.016 g. (0.007 mole) of 1-phenyl-2-dimethylaminoacetylene and 0.855 g. (0.007 mole) betaphenylethanol dissolved in 5 cc. diethyl ether were placed into a polyethylene flask. At $-80°$ C., about 0.3–0.4 g. of dry HF (obtained from 2 g. $KHF_2$ at 500–700° in a copper tube) was added to this mixture. A red precipitate formed, which liquefied at room temperature and separated from the ether solution as a second phase. After evaporation of the ether under vacuum at room temperature, the residue was distilled by dropping into a flask preheated at 140–190° at 10 mm. Hg. About 0.8 g. distilled product was obtained. By gas chromatography 4 mg. of pure $C_6H_5CH_2CH_2F$ were obtained from the distilled product. Elemental analysis: $C_8H_9F$ (M.W. 124.2) calculated: C 77.39, H 7.31. Found: C 77.64, H 7.77%.

*Example 6*

The procedure of Example 5 was repeated using 4.35 g. 1-phenyl-2-dimethylaminoacetylene, 3.66 g. beta-phenylethanol and 1.2–1.5 g. HF in 15 cc. diethyl ether. The distillation was carried out at 300° C. The product, $C_6H_5CH_2CH_2F$, was obtained in 90 percent yield.

| Acid | Water Acceptor | Yield of Acid Anhydride |
|---|---|---|
| Normal Butyric | $C_6H_5C\equiv CN(CH_3)_2$ | 96 |
| Do | $t\text{-}C_4H_9C\equiv CN(CH_3)_2$ | 93 |
| Do | Dicyclohexylcarbodiimide, $C_6H_{11}N=C=NC_6H_{11}$ | 70 |
| Do | Ethoxyacetylene, $HC\equiv COCH_2CH_3$ | 0 |
| Benzoic | $C_6H_5C\equiv CN(CH_3)_2$ | 98 |
| Do | $t\text{-}C_4H_9C\equiv CN(CH_3)_2$ | 97 |
| Do | Dicyclohexylcarbodiimide | 63 |
| Do | Ethoxyacetylene | 0 |

In Examples 7-12, the compounds designated Compounds A-J, have the following structures:

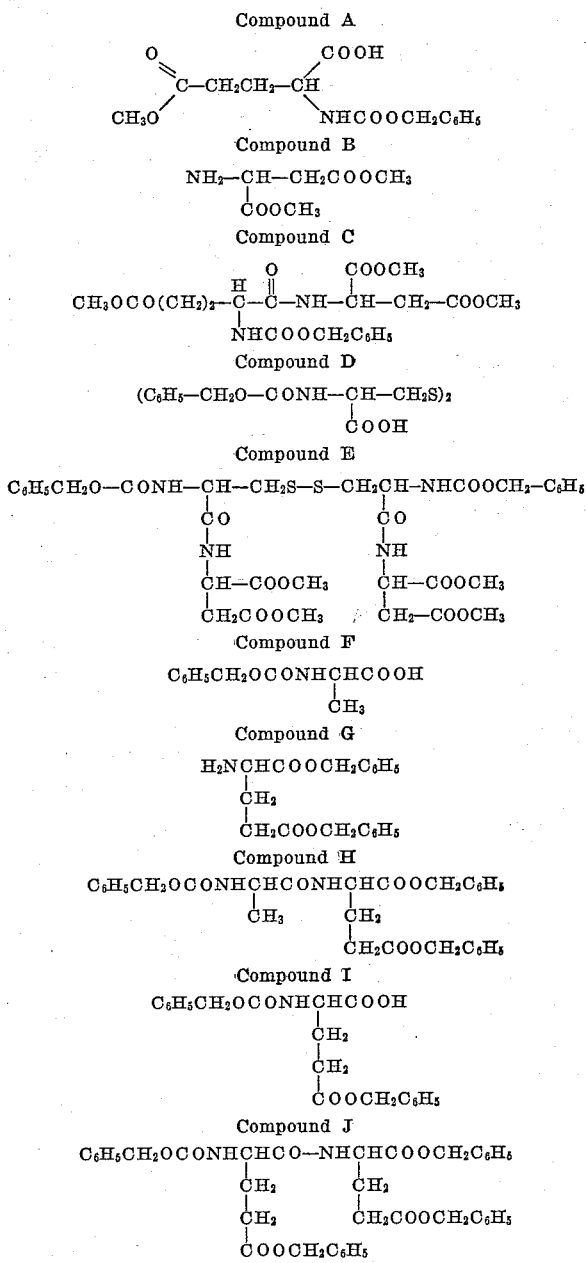

*Example 7*

A solution of 0.80 g. (0.005 mole) of dimethyl-L-aspartate (compound B) in 25 ml. tetrahydrofuran was added slowly to a mixture of 1.5 g. (0.005 mole) of N-carbobenzoxygamma-methyl-L-glutamate (compound A) and 0.62 g. (0.005 mole) of 1-t-butyl-2-dimethylaminoacetylene in 50 ml. tetrahydrofuran. After about 2 hours at 35–40° C. the reaction mixture was washed with 5 percent aqueous sodium hydroxide, and then diluted with hydrochloric acid. Tetrahydrofuran was evaporated under vacuum and the product, compound C, was precipitated by adding petroleum ether. The product was purified by recrystallization from diethyl ether-petroleum ether. The yield of compound C, M.P. 88° C., was 60 percent.

*Elemental analysis of compound C.*—Calculated for $C_{20}H_{26}N_2O_9$: C, 54.81; H, 5.94; N, 6.39%. Found: C, 54.45; H, 5.97; N, 6.63%.

When the same reaction was carried out by adding a tetrahydrofuran solution 1-t-butyl-2-dimethylaminoacetylene to a mixture of compound A and compound B in tetrahydrofuran, the yield of compound C was 97 percent.

*Example 8*

A solution of 1 gram of 1-phenyl-2-dimethylaminoacetylene in 25 ml. tetrahydrofuran was added over a 60 minute period to a mixture of 0.8 g. of dimethyl-L-aspartate (compound B) and 1.27 g. of bis-carbobenzoxy-L-cystine (compound D) dissolved in 30 ml. tetrahydrofuran. The temperature was maintained at 35–40° C. during the addition. The product was recovered by the methods of Example 7. A 99 percent yield (1.95 g.) of bis-carbobenzoxy - L - cystinyl - bis-dimethyl-aspartate (compound E) was obtained, melting point 82° C.

*Elemental analysis.*—Calculated for $C_{34}H_{42}N_4O_{14}S_2$ (M.W. 794.8): C, 51.41; H, 5.28; N, 7.05%. Found: C, 51.70; H, 5.60; N, 7.05%.

*Example 9*

Substantially identical results were obtained when the process of Example 8 was repeated using one gram of $t\text{-}C_4H_9C\equiv CN(CH_3)_2$ instead of $C_6H_5C\equiv CN(CH_3)_2$.

*Example 10*

Following the general procedure of Example 8, $C_6H_5C\equiv CN(CH_3)_2$ was added to a mixture of compound F and compound G. The product, compound H, was identified by melting point and a determination of optical rotation ($[\alpha]_D$ of $-16.6°$).

*Example 11*

Following the general procedure of Example 8, $C_6H_5C\equiv CN(CH_3)_2$ was added to a mixture of compound I and compound G. The product, compound J, was identified by melting point and a determination of optical rotation.

*Example 12*

Following the general procedure of Example 8, $(CH_3)_2NC\equiv CN(CH_3)_2$ was added to a mixture of compound A and compound B. The product, compound C, was identified by melting point and infrared spectrum, and was identical with the product of Example 7.

*Example 13*

A solution of $C_6H_5NH_2$ in tetrahydrofuran was added to a mixture of $C_6H_5COOH$ and $C_6H_5C\equiv CN(CH_3)_2$, dissolved in tetrahydrofuran at about 35° C. The yield of benzanilide, $C_6H_5CONHC_6H_5$, was about 50 percent. The product was identified by comparison with an authentic sample of benzanilide.

On a broader scope yneamines also undergo the following reactions.

(A) Condensation reactions

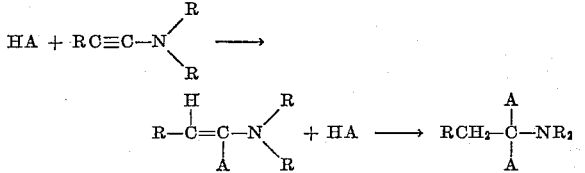

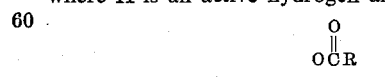

where H is an active hydrogen and A may include

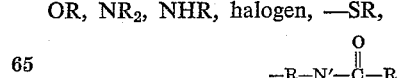

OR, NR$_2$, NHR, halogen, —SR, $$-R-N'-\overset{O}{\underset{\|}{C}}-R$$

CN, etc.

(B) Condensation reactions

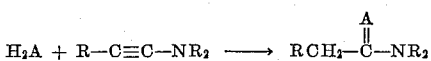

where H is an active hydrogen and A may include $>NR$, $>NH$, $>S$.

The above condensation products vary in their stability. Some of them collapse with the formation of the dehydrated product, i.e. the diester readily forms the corresponding anhydride and the amide corresponding to the particular aminoacetylene used. Others are quite stable.

(C) Condensation reactions with polyfunctional HA compounds:

If the HA compound is polyfunctional then polymers may be obtained in the condensation with aminoacetylenes.

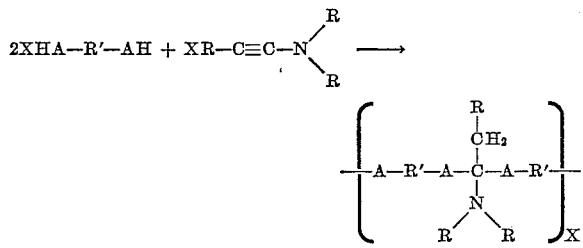

where A may include O, S, NR— etc.

In the case where the diadduct is unstable another type of polymer may be formed, for example, condensation of an aminoacetylene with adipic acid leads to poly (adipic anhydride).

(D) Addition reactions of unsaturated compounds such as Diels-Alder reactions with conjugated dienes and single or double additions of monoolefins and acetylenes:

*Examples*

(1)

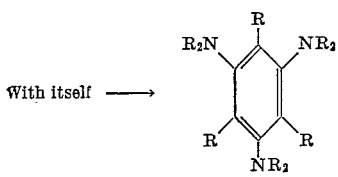

(2)

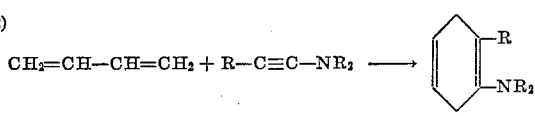

(3)

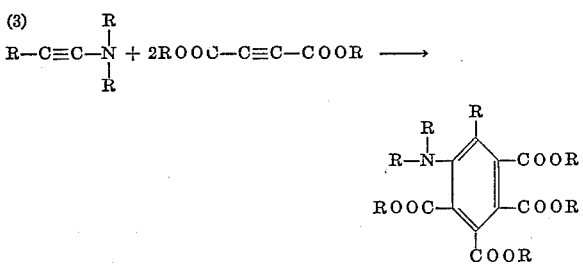

(4)

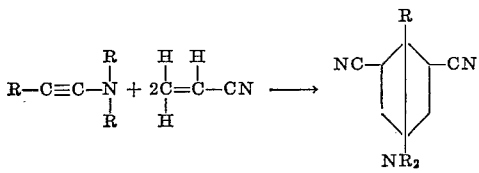

(5)

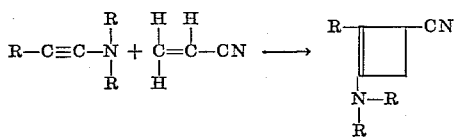

(E) Dipolar addition reactives with 1,2; 1,3 and 1,4-dipoles:

*Examples*

(1)

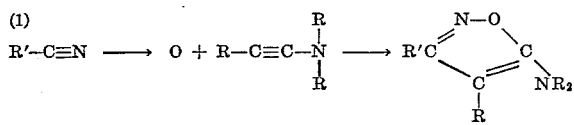

(2)

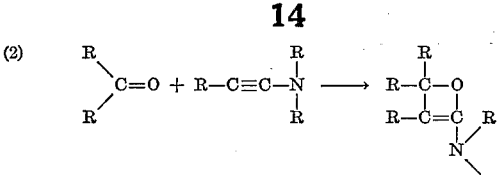

(3)

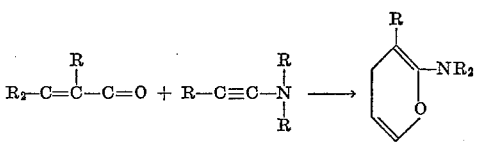

*Example 14*

A mixture containing 0.005 M of 1-phenyl-2-dimethylaminoacetylene and ethanol in 5 ml. ether was kept over night at room temperature. A trace of anhydrous HCl was used as a catalyst. The solvent was then evaporated and the residue distilled at 110° C./0.005 mm./Hg. to yield beta-dimethylamino-beta-ethoxystyrene (III). A field ionization mass spectroscopic determination of molecular weight yielded the theoretical value. To further prove the structure, compound III was hydrolized at room temperature with 6 N HCl to yield ethyl alpha-phenylacetate and the coproduct dimethylamine.

*Example 15*

Into a solution of 0.59 g. of 1-phenyl-2-dimethylaminoacetylene in 50 ml. of n-hexane was introduced a stream of dry HCl at −80° C. A white solid precipitated. The product (2-phenyl-1,1-dichloroethyl)-dimethylamine was analyzed for chlorine. Calculated for $C_{10}H_{13}Cl_2N$: Cl, 32.5%. Found Cl, 31.7%.

*Example 16*

N,N,N′,N′-tetraethyldiaminoacetylene (0.841 g.=0.005 M)

and aniline (0.416 g.=0.005 M) were dissolved in 15 ml. ether. When 0.8 ml. of a 0.665 N solution of HCl in ether was added a small amount of aniline hydrochloride precipitates. The solvent is evaporated from the ethereal solution and the residue distilled under 0.002 mm./Hg. At 115° C. 1.1 g. of the N-phenylamidine of N,N-diethyl-alpha-(diethylamino)-acetamide is obtained which is redistilled at 110° C./0.002 mm. Hg. Yield: 80%.

*Analysis.*—Calc. for $C_{16}H_{27}N_3$ (M=261.40): C, 73.51; H, 10.41; N, 16.08. Found: C, 72.61; H, 10.25; N, 15.40. M: 261 (determined by field ionization mass spectrometry).

*Example 17*

Three millimoles of 1-phenyl-2-diethylaminoacetylene was added at room temperature to three millimoles of dimethyl acetylene dicarboxylate in 5 ml. of ether containing a trace of anhydrous HCl. After 2 hours, the solvent was evaporated, and the product N,N-diethyl-(2,3,4,5-tetracarbomethoxy)-6-phenylaniline was distilled under vacuum. The distillate crystallized and was recrystallized from ether. M.P. 140° C.

*Analysis.*—Calc.: C, 63.0; H, 5.95; N, 3.06. Found: C, 63.44; H, 5.82; N, 3.20.

*Example 18*

0.046 mole of 4,4′-terphthalonitrile-N-dioxide (8 g.) and 0.02 mole (3.7 g.) of 1-phenyl-2-dimethylaminoacetylene were placed in an Erlenmeyer with 150 ml. of dry dioxane containing a trace of anhydrous HCl. The mixture was stirred for 15 hours. The product 4,4′-paraphenylenebis (4-phenyl-5-diethylamino-isoxazole) was then filtered and recrystallized from dioxane. M.P. 228° C. Yield 91%.

*Analysis.*—Calc.: C, 75.88; H, 6.71; N, 11.06. Found: C, 75.0; H, 6.92; N, 10.85.

What is claimed is:

1. In a condensation reaction wherein a first functional group of an organic compound, said first functional group being selected from the class consisting of carboxylic acid groups and alcoholic hydroxyl groups, reacts with an active hydrogen atom of a second functional group, said second functional group being selected from the class consisting of (a) hydrogen halide molecules and (b) alcoholic hydroxyl, primary amino, or secondary amino, said condensation reaction taking place with the formation of a chemical bond between elements of said two functional groups and with the elimination of water between said two functional groups, and said organic compounds are free of sites which are reactive in chemical reactions other than said condensation reaction, the improvement which comprises mixing together with said first and second functional group reactants as a water acceptor an aminoacetylene compound represented by the formula

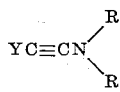

wherein R is a monovalent hydrocarbon group containing from 1 to 18 carbon atoms, Y is selected from the class consisting of R groups, hydrogen and $NR_2$ groups, and two R groups on the same nitrogen atom taken together with said nitrogen atom to form a heterocyclic ring with said nitrogen atom being the hetero atom in said heterocyclic ring.

2. In a process for producing acid anhydrides of the formula $(GCO)_2O$ by the water-eliminating condensation reaction of acids represented by the formula GCOOH, wherein G is an organic group free of sites which are reactive in chemical reactions other than said condensation reaction, the improvement which comprises mixing together with said acids GCOOH as a water acceptor an aminoacetylene compound represented by the formula

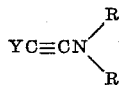

wherein R is a monovalent hydrocarbon group containing from 1 to 18 carbon atoms, Y is selected from the class consisting of R groups, hydrogen and $NR_2$ groups, and two R groups on the same nitrogen atom taken together with said nitrogen atom to form a heterocyclic ring with said nitrogen atom being the hetero atom in said heterocyclic ring.

3. In a process for producing amides of the formula GCONHG by the water-eliminating condensation reaction of an acid represented by the formula GCOOH and an amine represented by the formula $GNH_2$, wherein G is an organic group free of sites which are reactive in chemical reactions other than said condensation reaction, the improvement which comprises mixing together with said acid GCOOH and said amide $GNH_2$ as a water acceptor an aminoacetylene compound represented by the formula

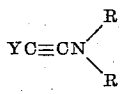

wherein R is a monovalent hydrocarbon group containing from 1 to 18 carbon atoms, Y is selected from the class consisting of R groups, hydrogen and $NR_2$ groups, and two R groups on the same nitrogen atom taken together with said nitrogen atom to form a heterocyclic ring with said nitrogen atom being the hetero atom in said heterocyclic ring.

4. The process in accordance with claim 3 wherein said aminoacetylene compound dissolved in an inert organic solvent is added to a mixture of said acid and said amine dissolved in an inert organic solvent.

5. The process in accordance with claim 4 wherein said acid is an amino-acid whose amine group has been blocked to render said amino group non-reactive, and said amine is an amino-acid whose carboxyl group has been blocked to render said carboxyl group non-reactive.

6. In a process for producing organic halides of the formula GX by the water-eliminating condensation reaction of an alcohol represented by the formula GOH and a hydrogen halide compound represented by the formula HX, wherein X is a halogen and wherein G is an organic group free of sites which are reactive in chemical reactions other than said condensation reaction, the improvement which comprises mixing together with said alcohol GOH and said hydrogen halide HX as a water acceptor an aminoacetylene compound represented by the formula

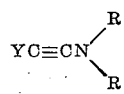

wherein R is a monovalent hydrocarbon group containing from 1 to 18 carbon atoms, Y is selected from the class consisting of R groups, hydrogen and $NR_2$ groups, and two R groups on the same nitrogen atom taken together with said nitrogen atom to form a heterocyclic ring with said nitrogen atom being the hetero atom in said heterocyclic ring.

7. The process in accordance with claim 6 wherein G is a hydrocarbon group.

8. In a process for producing esters of the formula GCOOG by the water-eliminating condensation reaction of an acid of the formula GCOOH and an alcohol of the formula GOH, wherein G is an organic group free of sites which are reactive in chemical reactions other than said condensation reaction, the improvement which comprises mixing together with said acid GCOOH and said alcohol GOH as a water acceptor an aminoacetylene compound represented by the formula

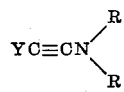

wherein R is a monovalent hydrocarbon group containing from 1 to 18 carbon atoms, Y is selected from the class consisting of R groups, hydrogen and $NR_2$ groups, and two R groups on the same nitrogen atom taken together with said nitrogen atom to form a heterocyclic ring with said nitrogen atom being the hetero atom in said heterocyclic ring.

9. The process for producing propionic anhydride which comprises mixing together in benzene solvent propionic acid and 1-phenyl-2-dimethyl-aminoacetylene.

10. The process for producing benzoic anhydride which comprises mixing together in benzene solvent benzoic acid and 1-t-butyl-2-dimethylaminoacetylene.

11. The process for producing betaphenyl ethylfluoride, $C_6H_5CH_2CH_2F$, which comprises mixing together in diethylether solvent beta-phenylethanol, hydrogen fluoride and 1-phenyl-2-dimethylaminoacetylene.

12. The process for producing benzanilide which comprises mixing together in tetrahydrofuran solvent benzoic acid, aniline and 1-phenyl-2-dimethylaminoacetylene.

13. The process for producing bis-carbobenzoxy-L-cystinyl-bis-dimethyl-aspartate which comprises adding a tetrahydrofuran solution of 1-phenyl-2-dimethylaminoacetylene to a mixture of dimethyl-L-aspartate and bis-carbobenzoxy-L-cystine dissolved in tetrahydrofuran.

14. The process for producing N-carbobenzoxy-gamma-methyl-L-glutamyl-dimethyl-L-aspartate which comprises adding a tetrahydrofuran solution of bis-dimethyl-aminoacetylene to a mixture of dimethyl-L-aspartate and N-carbobenzoxy-gamma-methyl-L-glutamate dissolved in tetrahydrofuran.

(References on following page)

References Cited

UNITED STATES PATENTS 1,425,500  8/1922  Matheson et al. _____ 250—546

OTHER REFERENCES

Johnson, A.: The Chemistry of Acetylene Compounds, vol. 2, London, Edward Arnold and Co., 1950, page 249.

Piganiol, P.: Acetylene Homologs and Derivatives, Brooklyn, Mapleton House, 1950, pages 170, 180, 189, and 197.

Wolf et al.: Justus Liebig's Annalen der Chemie, 33–42 (1960).

LEWIS GOTTS, *Primary Examiner.*

HENRY R. JILES, *Examiner.*

RICHARD GALLAGHER, MELVYN M. KASSENOFF, *Assistant Examiners.*